(12) United States Patent
Jones

(10) Patent No.: US 9,146,341 B2
(45) Date of Patent: Sep. 29, 2015

(54) MOUNT ARRANGEMENT FOR SUPPORTING A TAPERED LIGHT PIPE

(71) Applicant: Qioptiq Limited, Denbighshire (GB)

(72) Inventor: Dennis Jones, Denbigshire (GB)

(73) Assignee: Qioptiq Limited, Denbighsire (GB)

( * ) Notice: Subject to any disclaimer, the term of this patent is extended or adjusted under 35 U.S.C. 154(b) by 0 days.

(21) Appl. No.: 14/051,970

(22) Filed: Oct. 11, 2013

(65) Prior Publication Data

US 2014/0241005 A1 Aug. 28, 2014

(30) Foreign Application Priority Data

Feb. 22, 2013 (GB) .................................. 1303179.4

(51) Int. Cl.
*F21V 8/00* (2006.01)
*G02B 7/00* (2006.01)
*G02B 27/09* (2006.01)
*G03B 21/20* (2006.01)

(52) U.S. Cl.
CPC ............ *G02B 6/0008* (2013.01); *G02B 6/0006* (2013.01); *G02B 7/00* (2013.01); *G02B 27/0994* (2013.01); *G03B 21/208* (2013.01)

(58) Field of Classification Search
CPC ...... G02B 6/0008; G02B 6/0006; G02B 7/00; G02B 27/0994; G03B 21/208
USPC .................................................. 362/551–581
See application file for complete search history.

(56) References Cited

U.S. PATENT DOCUMENTS

| 4,461,537 | A | * | 7/1984 | Raymer et al. .................. 385/88 |
| 5,548,676 | A | * | 8/1996 | Savage, Jr. ...................... 385/92 |
| 5,732,176 | A | * | 3/1998 | Savage, Jr. ...................... 385/92 |
| 5,939,702 | A |   | 8/1999 | Knighton |
| 6,328,464 | B1 | * | 12/2001 | Bernardini .................... 362/558 |
| 6,634,779 | B2 | * | 10/2003 | Reed .............................. 362/555 |
| 7,347,632 | B2 | * | 3/2008 | Farr ................................ 385/89 |

(Continued)

FOREIGN PATENT DOCUMENTS

JP 10186146 A 7/1998

OTHER PUBLICATIONS

International Search Report and Written Opinion for PCT/GB2014/050527 dated May 6, 2014.

(Continued)

*Primary Examiner* — Anne Hines
*Assistant Examiner* — Jose M Diaz
(74) *Attorney, Agent, or Firm* — Peter A. Nieves; Sheehan Phinney Bass + Green PA

(57) ABSTRACT

There is disclosed mount arrangement for supporting a tapered light pipe (5) of a type having a relatively wide end (8), a relatively narrow end (7), and an outer surface (9). The mount arrangement includes: a support assembly (25) provided within a housing (13) and having a central bore (28) for receipt of a said light pipe (5) through the support assembly (25), the support assembly (25) being arranged for movement within the housing (13) along the axis of the bore (28), and having within said central bore (28) an array of inwardly directed convex bearing surfaces (33) arranged in spaced relation to one another around the central bore (28). The support assembly (25) is biased towards the relatively wide end (8) of the light pipe (5) so as to urge the convex bearing surfaces (33) into contact with the outer surface (9) of the light pipe (5).

20 Claims, 8 Drawing Sheets

(56) References Cited

U.S. PATENT DOCUMENTS

| | | | |
|---|---|---|---|
| 7,458,708 B2* | 12/2008 | Sheng | 362/551 |
| 8,346,035 B2* | 1/2013 | Robitaille | 385/27 |
| 8,469,571 B2* | 6/2013 | Yang et al. | 362/581 |
| 8,540,409 B2* | 9/2013 | Eichelberger | 362/581 |
| 2002/0136027 A1* | 9/2002 | Hansler et al. | 362/559 |
| 2004/0057027 A1* | 3/2004 | Tani | 353/102 |
| 2004/0062043 A1 | 4/2004 | Vastola et al. | |
| 2005/0276064 A1* | 12/2005 | Wu et al. | 362/555 |
| 2006/0028838 A1* | 2/2006 | Imade | 362/602 |
| 2007/0024971 A1* | 2/2007 | Cassarly et al. | 359/487 |
| 2008/0278959 A1* | 11/2008 | Sun et al. | 362/433 |
| 2012/0099324 A1 | 4/2012 | Robitaille | |
| 2013/0215636 A1* | 8/2013 | Angelini et al. | 362/555 |
| 2014/0003084 A1* | 1/2014 | McHenry et al. | 362/581 |

OTHER PUBLICATIONS

GB Search Report for Application No. 1303179.4 mailed Jul. 1, 2013.

* cited by examiner

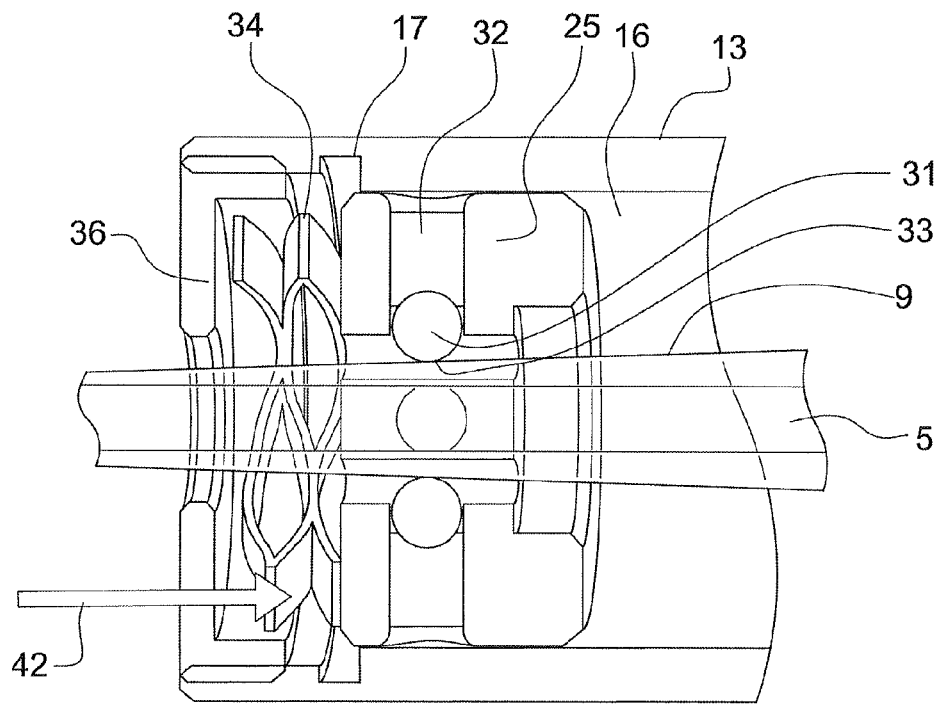
FIG 13
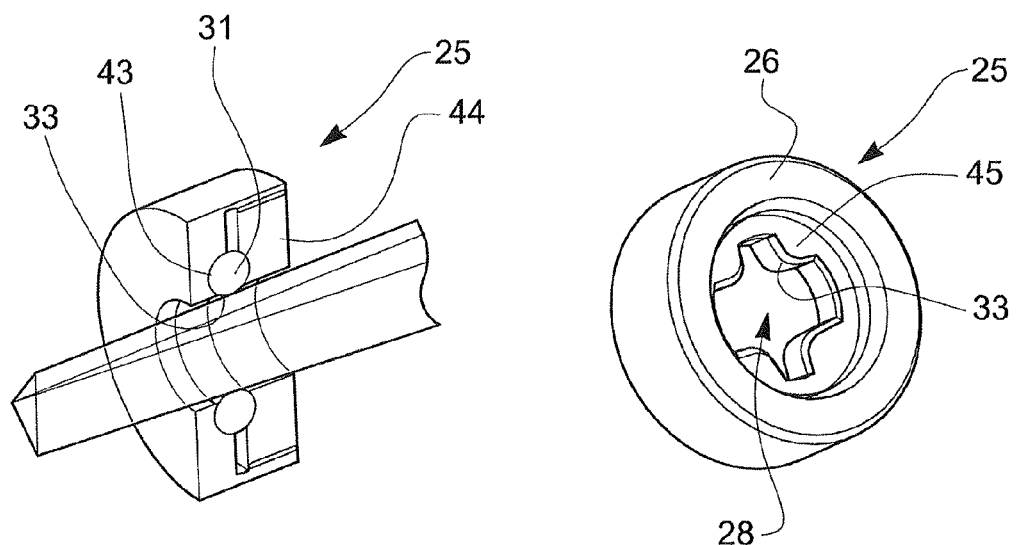
FIG 14
FIG 15

MOUNT ARRANGEMENT FOR SUPPORTING A TAPERED LIGHT PIPE

The present invention relates to a mount arrangement for supporting a light pipe, and more particularly relates to a mount arrangement for supporting a tapered light pipe of a type having a relatively wide end and a relatively narrow end.

Light pipes are well known optical components, which are commonly used for optical applications which require homogenized light. Light pipes utilize the principle of total internal reflection to homogenize the light emitted from non-uniform light sources, regardless of the light source's spectral characteristics. Light pipes are also commonly referred to as homogenizing rods, light rods, integrating rods and wave guides, and so the term "light pipes" as used herein should be interpreted accordingly.

It is common for light pipes to take the form of substantially solid rods of fused silica, and they are often configured so as to have a polygonal cross-sectional profile (for example square, rectangular, hexagonal or octagonal), with sharp corner edges extending between flat facets of the pipe's outer surface. It is also common for light pipes to be tapered along their length between a first, relatively wide, end and a second, relatively narrow, end.

As indicated above, light pipes rely on the principal of internal reflection in order to homogenize light, as illustrated schematically in FIG. 1, which for simplicity shows a straight, non-tapered light pipe provided in optical connection to a source 2 of non-uniform light such as a conventional LED or the like. As shown in FIG. 1, the light emitted from the source 2 enters the end of the light pipe and reflects internally from the sides of the pipe as it passes along the pipe.

Because light pipes rely on the principle of internal reflection in this way, it can be difficult to mount light pipes sufficiently securely to prevent them from moving due to shock, vibration, thermal expansion and contraction and the like, without adversely affecting their optical performance. FIG. 2 illustrates a light pipe which is supported along its length by a mount or support 3 which makes contact with an area 4 of the outer surface of the light pipe. This area of contact 4 interferes with the internal reflection going on inside the light pipe and can result in light being scattered as illustrated by the rays shown in phantom, thereby resulting in poor performance of the light pipe in homogenizing the light emitted from the source 2. It is therefore advantageous to support light pipes with the minimum area of contact points possible, whilst also ensuring that the pipe is mounted securely, and with the ability to expand and contract due to thermal influences in use.

It is therefore an object of the present invention to provide an improved mount arrangement for supporting a tapered light pipe.

According to the present invention, there is provided a mount arrangement for supporting a tapered light pipe of a type having a relatively wide end, a relatively narrow end, and an outer surface, the mount arrangement including: a support assembly provided within a housing and having a central bore for receipt of a said light pipe through the support assembly, the support assembly being arranged for movement within the housing along the axis of the bore, and having within said central bore an array of inwardly directed convex bearing surfaces arranged in spaced relation to one another around the central bore, wherein the support assembly is biased towards the relatively wide end of the light pipe so as to urge the convex bearing surfaces into contact with the outer surface of the light pipe.

Preferably, the support assembly is spring-biased towards the relatively wide end of the light pipe.

Advantageously, the support assembly is biased by a wave spring.

Conveniently, the support assembly is biased by a coil spring.

The spring is preferably a compression spring.

Preferably, said spring defines a central bore sized to fit around the light pipe in spaced relation to the light pipe.

Advantageously, each said convex bearing surface has at least a region, arranged for contact with the outer surface of the light pipe, which has the geometry of a spherical cap.

Conveniently, each said convex bearing surface is provided as an integral part of the support assembly.

Preferably, each said convex bearing surface is defined by a respective ball mounted to the support assembly.

Advantageously, each said ball is resiliently mounted to the support assembly to permit a degree of resilient deflection in a generally radial direction relative to the central bore.

Conveniently, each said ball is resiliently mounted to the support assembly by a flexible adhesive.

Preferably each said ball is mounted at the end of a respective passage to as to project inwardly of the bore from the passage, and wherein at least a region of each passage adjacent the respective ball is filled with said adhesive.

Advantageously, said convex bearing surfaces are equi-spaced around the central bore of the support assembly.

Conveniently, the mount arrangement is configured to support a light pipe of a type having a polygonal cross-sectional profile, wherein each said convex bearing surface is arranged for contact with a respective facet of the outer surface of the light pipe.

Preferably the mount arrangement includes a second support assembly in addition to said, first, support assembly, wherein the second support assembly is provided in spaced relation to the first support assembly for the receipt therethrough of a wider part of said tapered light pipe, the second support assembly also being biased towards the relatively wide end of the light pipe.

Advantageously, the second support assembly is biased away from the first support assembly by a spring arranged between the two assemblies.

So that the invention may be more readily understood, and so that further features thereof may be appreciated, embodiments of the invention will now be described by way of example with reference to the accompanying drawings in which:

FIG. 13 is an enlarged view showing the support assembly, the spring element, and the end cap at one end of the housing and their interaction with the narrow end of the light pipe;

FIG. 14 is a diametric cross-sectional view, similar to that of FIG. 8, but which shows a support assembly in accordance with an alternative embodiment of the invention;

FIG. 15 is a perspective view, similar to that of FIG. 7, but which shows a support assembly in accordance with another alternative embodiment.

Figure 1:
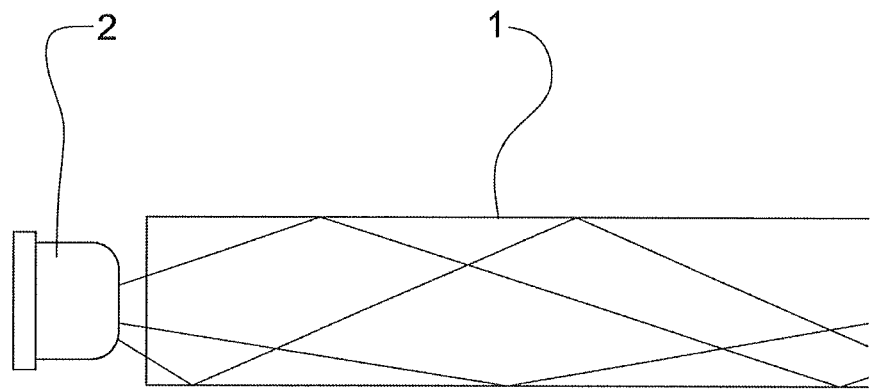
FIG. 1 (discussed above) is a schematic longitudinal cross-sectional view through part of a conventional light pipe, illustrating its function in homogenizing light emitted from a light source.
Figure 2:
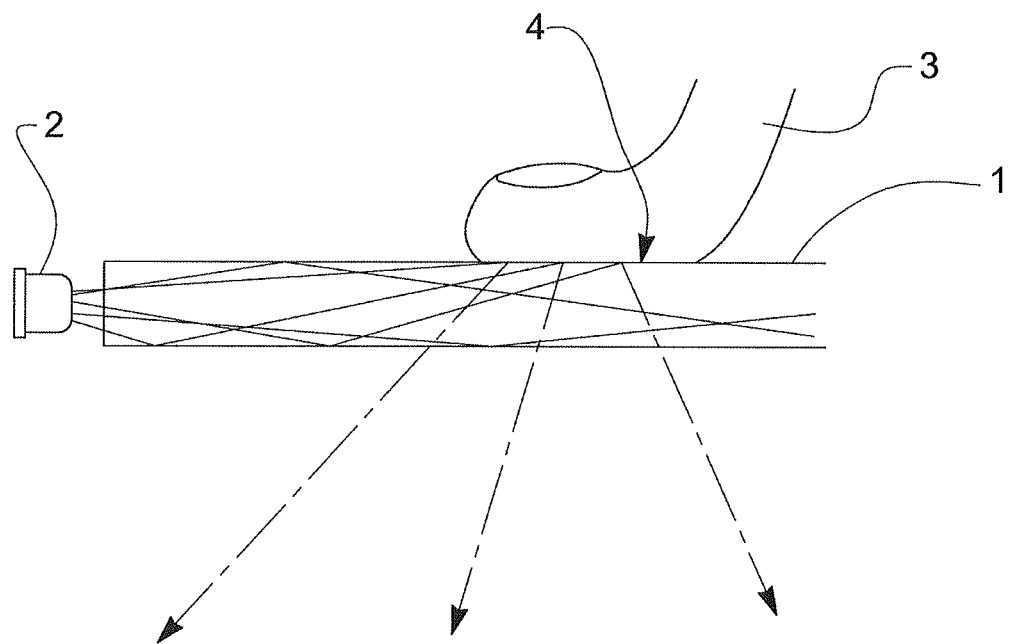
FIG. 2 (discussed above) is a longitudinal cross-sectional view similar to that of FIG. 1, illustrating the effect on optical performance of the light pipe which can occur with a poorly configured mount arrangement.
Figure 3:
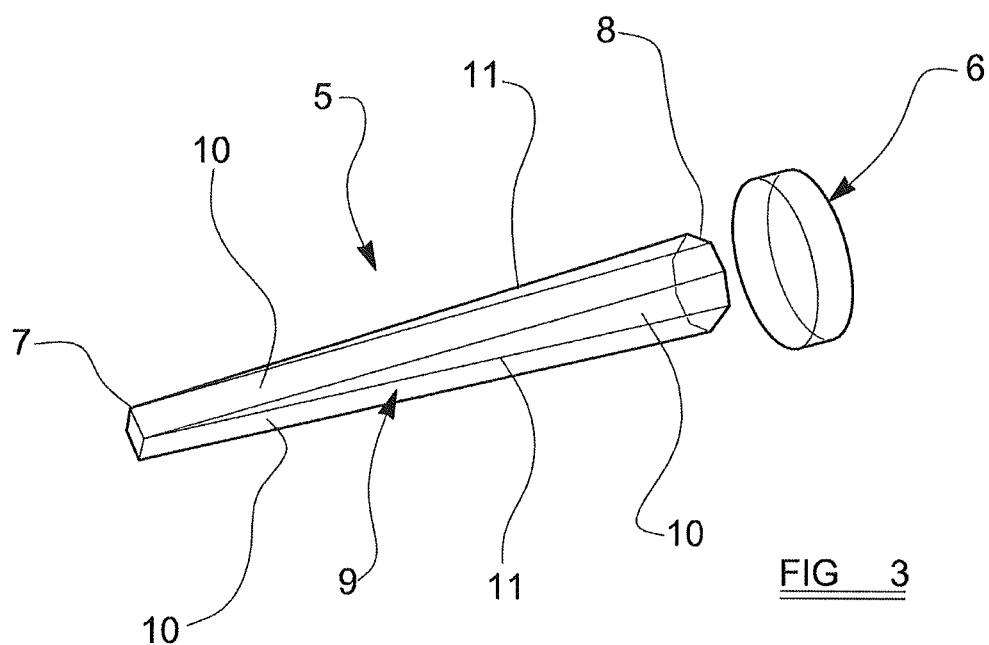
FIG. 3 is a perspective view showing a tapered light pipe for support by the mount arrangement of the present invention, in combination with an optical make-up piece.

Turning now to consider FIG. 3, there is illustrated a light pipe 5 and an accompanying make-up piece 6 whose function will be explained in more detail hereinafter. The light pipe 5 is elongate and has a tapered configuration such that its cross-sectional dimension increases from a minimum value at a first, relatively narrow, end 7 to a maximum value at a second, relatively wide, end 8. The actual cross-sectional profile of the light pipe 5 is not considered to be of crucial importance to the mount arrangement of the present invention. However, it is considered preferable for the light pipe 5 to have a polygonal cross-sectional profile such that its outer surface 9 is defined by a plurality of planar facets 10 extending between generally longitudinal side edges 11. The side edges 11 preferably define sharp corners. The particular light pipe 5 illustrated in FIG. 3 has a square cross-sectional profile at its extreme narrow end 7, but has an octagonal cross-sectional profile (of increasing dimension) along its length and at its wide end 8. The outer surface 9 of the light pipe is thus defined by two pairs of oppositely arranged rectangular facets, and four triangular facets which take the form of fillets arranged between the rectangular facets. Of course, other cross-sectional profiles are also possible without departing from the scope of the present invention.

The make-up piece 6 takes the form of a short right-circular cylinder formed from the same optical material as the light pipe 5 itself; for example fused silica, and thus has the same refractive index and other optical properties as the light pipe 5. The diameter of the make-up piece is quite significantly larger than the maximum dimension of the widest end 8 of the light pipe.

Figure 4:
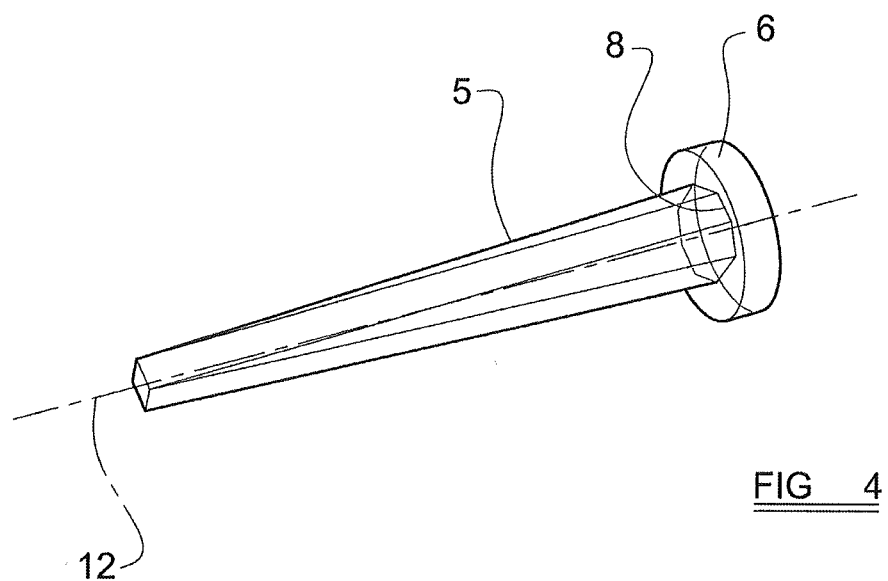
FIG. 4 is a perspective view similar to that of FIG. 3, showing the light pipe and the make-up piece interconnected.

FIG. 4 shows the light pipe 5 and the make-up piece 6 interconnected and secured to one another such that the end face of the light pipe 5, at its widest end 8, is affixed to the circular planar side face of the make-up piece 6. The make-up piece 6 and the light pipe 5 are preferably bonded to one another via the use of a suitable indexed linked adhesive in order to prevent any adverse optical characteristics arising at the interface between the two components. It is important that the light pipe 5 and the make-up piece 6 are both square to one another and coaxial relative to the optical axis 12 of the light pipe.

Figure 5:
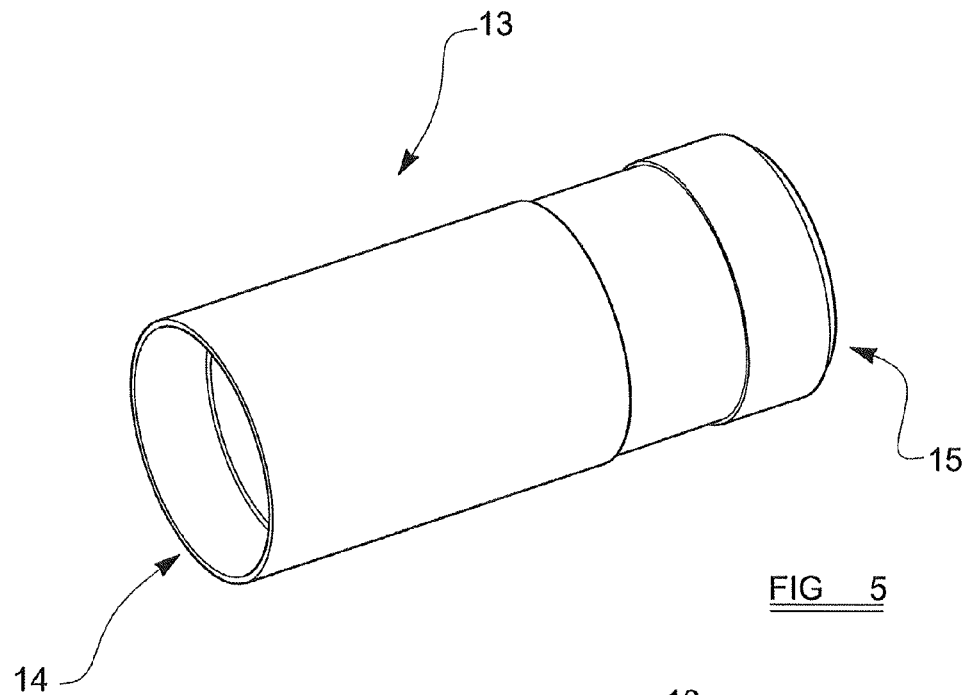
FIG. 5 is a perspective view of a main housing forming part of a mount arrangement in accordance with the present invention.
Figure 6:
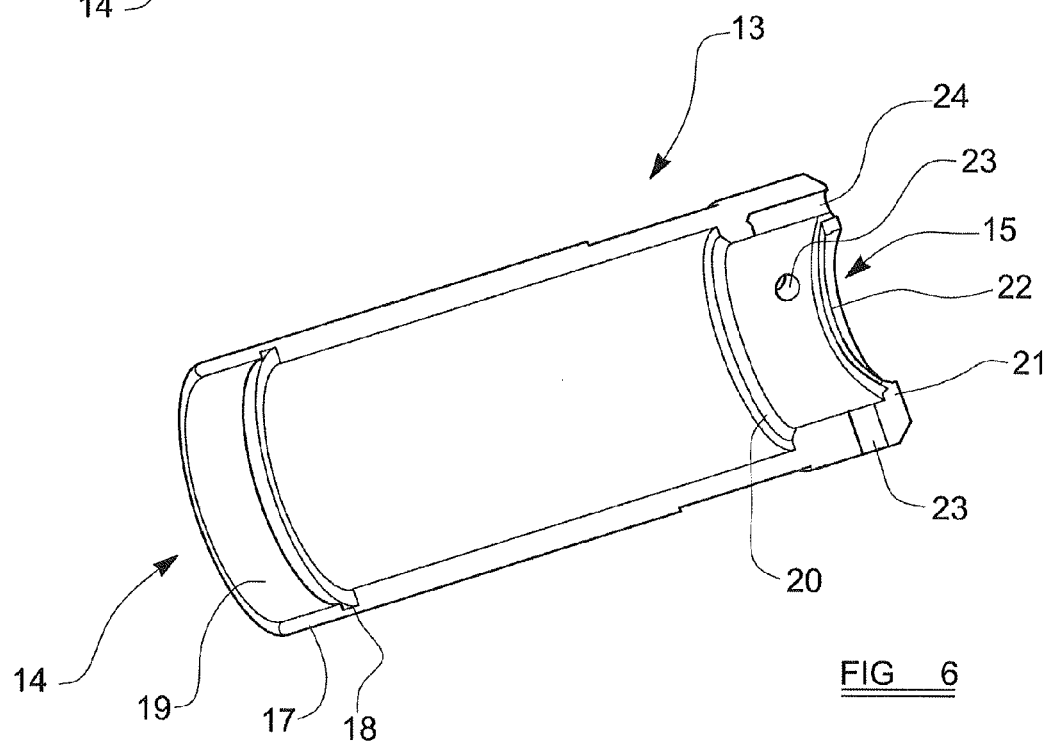
FIG. 6 is a longitudinal cross-sectional view through the housing of FIG. 5, showing features of its internal configuration.

Turning now to consider FIGS. 5 and 6, there is shown a hollow main housing 13 having a cylindrical configuration which is open at both ends 14, 15. The housing is preferably formed of metal, with Aluminium alloy believed to be particularly well suited for use in the present invention on account of its good strength, durability and lightness.

As illustrated most clearly in FIG. 6, the internal bore of the housing 13 has a main central section 16 with a constant internal diameter and a smooth internal wall and which extends along the majority of the length of the housing between the two ends 14, 15. At its first open end 14, the housing has a short end region 17 of slightly larger internal diameter than the central region 16, and which is separated from the central region 16 by a narrow peripheral channel 18 of even larger internal diameter. The inner surface of the end region 17 is screw-threaded, at 19.

At its second open end 15, the housing 13 has a short end region 20 which is at least as long in the axial direction of the housing 13 as the axial length of the make-up piece 6. This end region 20 of the housing has an internal diameter which is only very slightly greater than the diameter of the make-up piece 6, and terminates at the open end 15 with an inwardly directed lip 21 which defines an abutment shoulder 22. The end region 20 may be associated with one or more radially oriented flow passages 23 which extend through the side wall of the housing 13, and/or one or more axial flow passages 24 which extend parallel with the longitudinal axis of the housing from the end 15. The purpose of the flow passages 23, 24 will be explained in more detail hereinafter.

Figure 7:
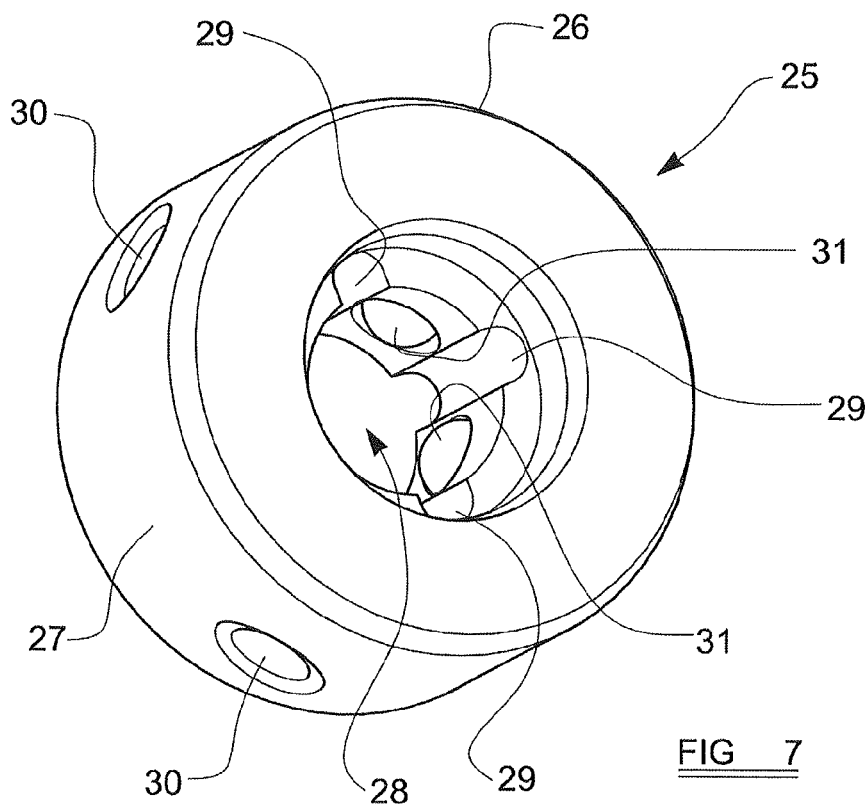
FIG. 7 is a perspective view of a support assembly forming another part of the mount arrangement.
Figure 8:
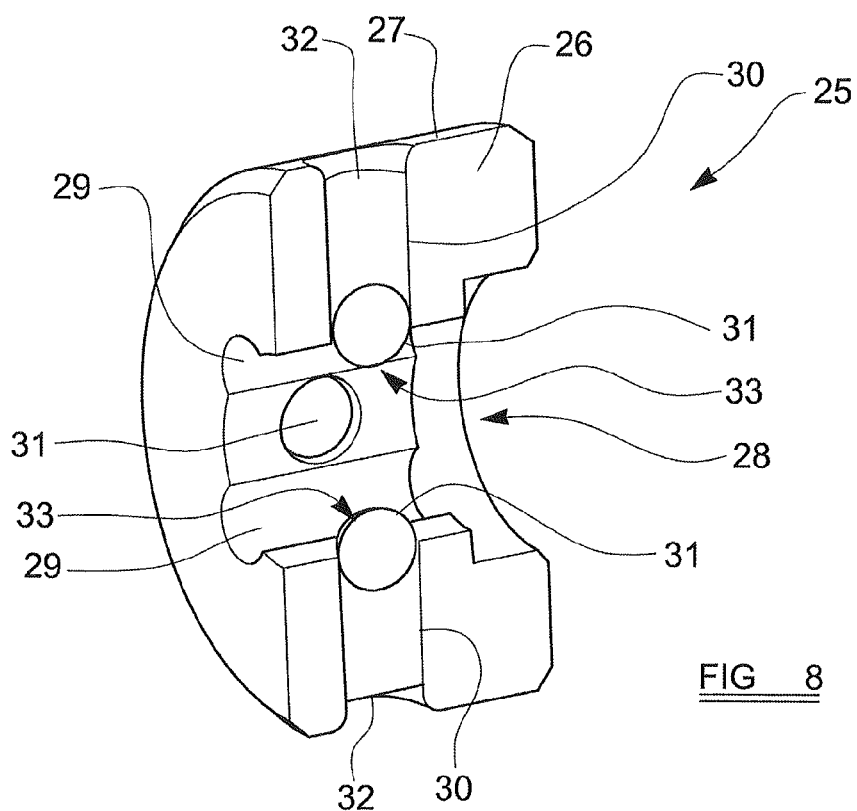
FIG. 8 is a diametric cross-sectional view through the support assembly of FIG. 7.

Turning now to consider FIGS. 7 and 8, there is illustrated a support assembly 25 which forms an important part of the mount arrangement of the present invention. The support assembly comprises a support housing 26 of generally annular form defining a smooth outer surface 27 and central bore 28, and which is preferably formed from Aluminium alloy; again on account of its good strength, durability and lightness. The support housing 26 has an outer diameter which is very slightly less than the internal diameter of the main central section 16 inside the main housing 13 illustrated in FIG. 6, and can thus be received as a close sliding fit within the central section 16 of the main housing as will be described below. The central bore 28 of the support housing 25 is sized so as to fit loosely over at least a region of the light pipe 5 with clearance all around the light pipe, and in the embodiment illustrated is sized to fit loosely over the region of the light pipe 5 which is located generally towards its narrow end 7.

As shown most clearly in FIG. 7, the illustrated support assembly has a central bore 28 whose cross-sectional profile resembles a circle with four equi-spaced outwardly extending lobes 29. These lobes 29 are provided to ensure good clearance between the central bore and the longitudinal side edges 11 of the light pipe 5. It is to be appreciated, however, that the central bore 29 could alternatively be configured to have a different cross-sectional profile.

Four radially extending passages 30 are provided through the annulus of the support housing 26 at radial positions which are spaced between the lobes 29 of the central bore 28. The passages 30 are each open at both their outer ends, via ports in the outer surface 27 of the housing, and at their inner ends into the central bore 28.

Received within each radial passage 30 is a spherical ball 31, each ball 31 being sized so as to be a close fit within its respective passage. As illustrated, the balls 31 are located at the inner ends of their respective passages 30 so as to project inwardly into the central bore 28 from the passages 30. The balls 31 are each secured in this position via adhesive 32 which, as illustrated most clearly in FIG. 8, can be injected into the passages 30 so as to at least partially fill a region of each passage 30 immediately adjacent/behind the balls 31. The adhesive is preferably a flexible adhesive having a degree of resilience when cured, such as, for example, silicone-based adhesives available under the trade names Silcoset or RTV. In this way, the adhesive serves to resiliently mount the balls relative to the support housing 26 so that they can be deflected by a small degree in a direction radially outwardly along their respective passages 30.

It is to be appreciated that the balls 31 in the above-mentioned support assembly 25 each define a respective radially inwardly directed convex bearing surface 33 for contact with the outer surface of the light pipe 5 in a manner which will be described in more detail below. These bearing surfaces 33 are arranged in spaced relation to one another around the central bore 28, and in the particular arrangement illustrated in FIG. 8, each has the geometry of a spherical cap by virtue of being defined by the surface of a ball 31.

The balls 31 defining the bearing surfaces 33 are formed from a material which will not scratch or otherwise damage the outer surface 9 of the light pipe through contact with it, and in a preferred embodiment may be either metallic (e.g. formed from stainless steel), or ceramic.

Figure 9:
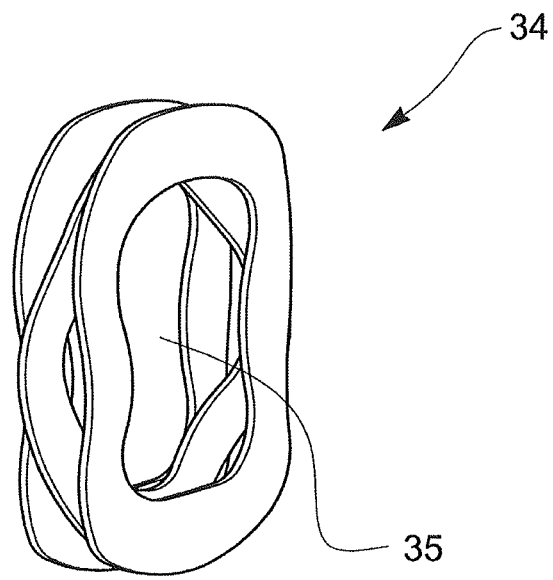
FIG. 9 is perspective view of a spring element.

FIG. 9 illustrates a compression spring 34 in the form of a wave spring, of a general type known per se. The spring 34 has an outer diameter which is somewhat less than the outer diameter of the support housing 26, and defines a central bore 35 which has a diameter which is preferably somewhat larger than the diameter of the central bore 28 formed through the support housing 26, but in any event is sized to fit around a narrow end region of the light pipe 5, in spaced relation to the light pipe.

Figure 10:
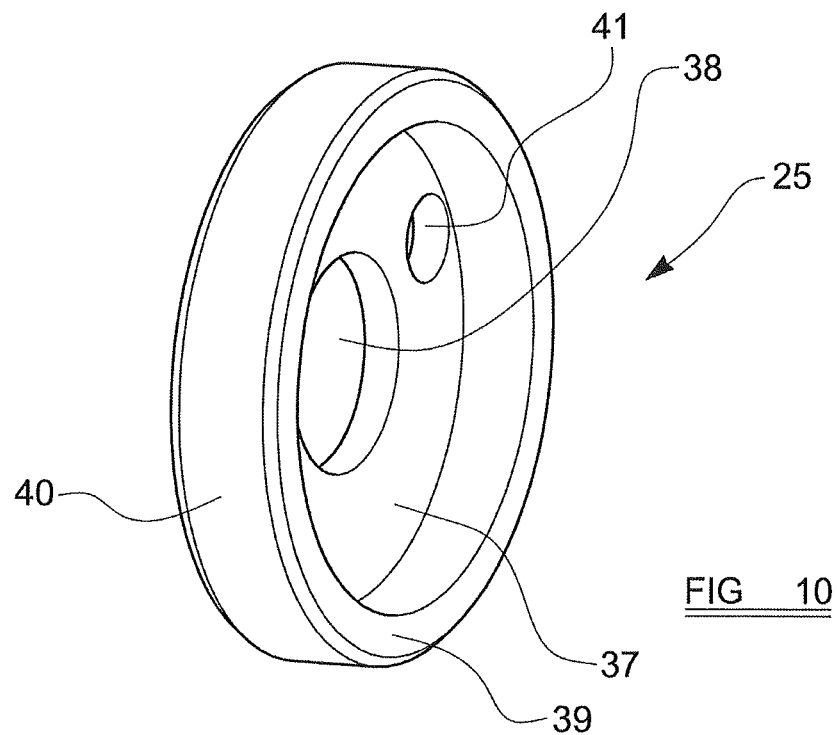
FIG. 10 is a perspective view of an end cap.

FIG. 10 illustrates an end cap 36 which is configured to cover the open end 14 of the main housing 13. The end cap 36 is preferably formed from the same material as the main housing 13 and takes the form of a flat circular plate 37 having a central aperture 38 and a peripheral flange 39 having an inner diameter which is slightly greater than the outer diameter of the spring 34 illustrated in FIG. 9. The outer surface of the end cap is threaded, at 40, for threaded engagement with the threads 19 provided within the first end region 17 of the main housing 13. The central aperture 38 is sized to receive the narrow end region of the light pipe 5 with clearance. Additionally, the end cap 36 may be provided with one or more vent apertures through its end plate 37.

Figure 11:
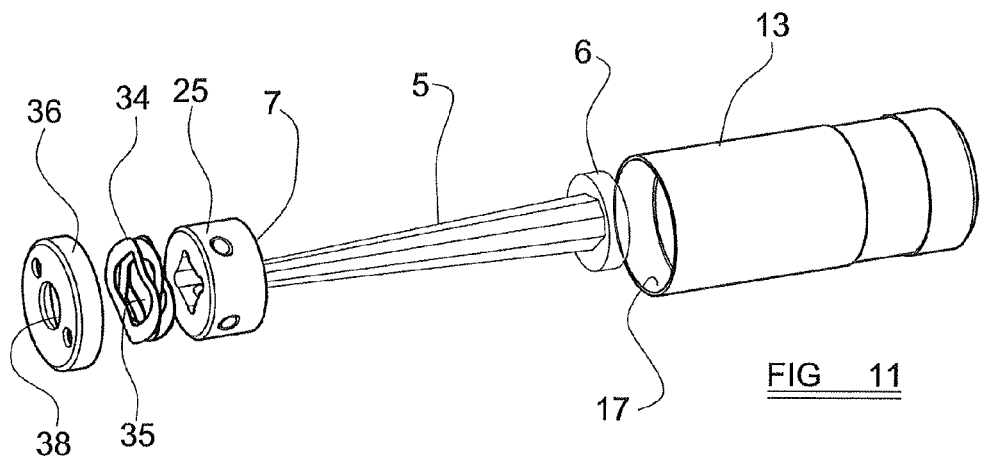
FIG. 11 is an exploded perspective view showing the housing, the light pipe with make-up piece, the support assembly, the spring element and the end cap ready for assembly.

Turning now to consider FIGS. 11 and 12, assembly of the afore-mentioned components, as illustrated in FIGS. 3 to 10, into the mount arrangement will now be described.

As illustrated, the interconnected light pipe 5 and make-up piece 6 are inserted as a unit into the main housing 18 from its end 14 (opposite to the end 15 having the lip 21 and abutment shoulder 22), generally along the longitudinal axis of the housing, such that the make-up piece 6 is received within the end region 20 of the housing 13. As already mentioned, the inner diameter of the end region 20 is very slightly greater than the outer diameter of the make-up piece 6, and so the make-up piece is received within the end region 20 as a close sliding fit. The end face of the make-up piece 6 abuts against the abutment shoulder 22 defined by the lip 21. The light pipe 5 is in this way aligned with the main housing 13 such that the optical axis 12 of the light pipe and the longitudinal axis of the cylindrical housing are coincident.

As will thus be appreciated, the make-up piece 6, and in particular its tight fit within the end region 20 of the main housing 13, serves to locate and mount the light pipe 5 concentrically with the main housing 13 at its widest end 8. Support of the light pipe towards its narrow end is provided by the support assembly 25 as will now be described.

The support assembly 25 is fitted over the narrow end 7 of the light pipe 5, such that the light pipe extends through its central bore 28, and is inserted into the still open end 14 of the housing 13 so as to be slideably received within the left-hand end part (as illustrated) of the central region 16 of the housing. Because the outer diameter of the support housing 26 of the support assembly 25 is only very slightly less than the inner diameter of the central region 16 of the main housing 13, the support assembly is slideable within the central region 16 of the housing 13.

Finally, the wave spring 34 is positioned within the end cap 36 so as to sit inside the peripheral flange 39, with its central bore 28 aligned with the central aperture 38 of the end cap 36. The end cap 36 is then threadedly engaged with the screw-threaded end region 17 of the light pipe and tightened thereagainst.

The make-up piece 6 may be secured within the end region 20 of the main housing 13 via the use of adhesive (not shown) which may, for example, be injected into and along the radial flow passages 23 and/or the axial flow passage(s) 24 at the end of the housing. If the make-up piece 6 is to be secured in this manner, it is preferable for the adhesive to be applied after the support assembly 25 and associated components at the opposite end of the light pipe have been assembled within the main housing 13, so as to avoid the possibility of the make-up piece 6 being secured in a position which may be out of axial alignment with the housing 13.

Figure 12:
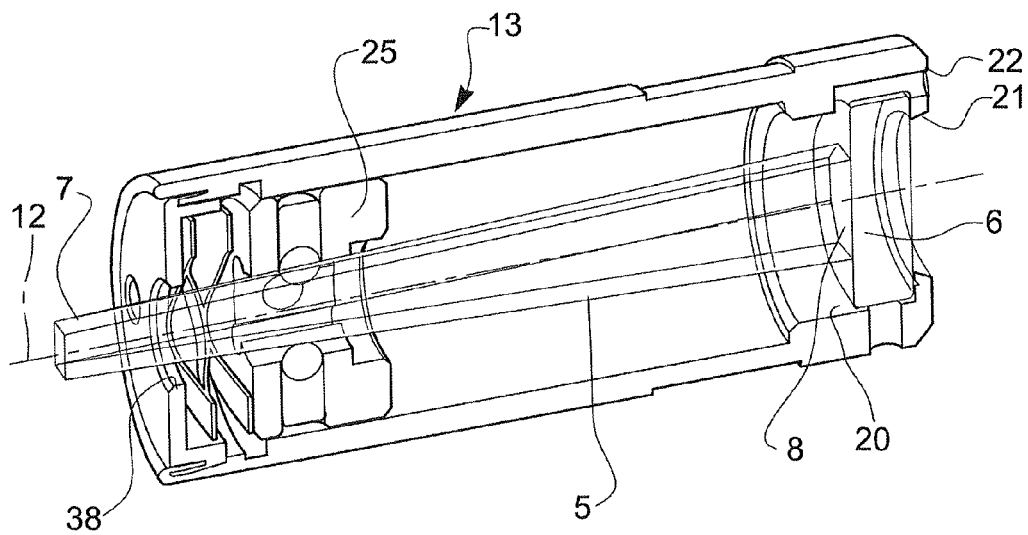
FIG. 12 is a longitudinal view through the assembled mount arrangement.

Following assembly of the mount arrangement as described above, it adopts the configuration as illustrated in FIG. 12. As will be noted, when the end cap 36 is threadedly tightened against the main housing 13, the narrow end region of the light pipe 5 extends completely through the central bore 35 of the wave spring 34 and the aligned central aperture 38 of the end cap 36 so as to project outwardly from the now closed housing 13. Additionally, the wave spring 34 is brought to bear against the adjacent annular surface of the support housing 26, and is axially compressed between the end cap 36 and the support assembly 25. The spring 34 thus applies a biasing force, as denoted by arrow 42 in FIG. 13, to the support assembly 25. The force 42 is effective to urge the entire support assembly 25 along the optical axis 12 of the light pipe 5, in a sliding manner within the main housing 13, towards the wider end 8 of the light pipe.

The balls 31 of the support assembly 25 are positioned in their respective passages 30, and so spaced relative to the central axis of the assembly's central bore 28, such that their radially inwardly directed convex bearing surfaces 33 each come into contact with the outer surface 9 of the light pipe 5, as illustrated in FIG. 13, whilst the support housing 26 remains clear of, and spaced from, the light pipe 5. As perhaps shown more clearly in FIG. 12, balls 31 are preferably arranged such that their convex bearing surfaces 33 contact respective facets 10 of the light pipe surface 9, thereby remaining clear of the sharp edges 11 of the light pipe which could easily be damaged by contact with the balls, or indeed any other part of the support assembly 25.

As will be appreciated, because each of the balls 31 is resiliently mounted in its respective passage 30 via the flexible adhesive 32, the balls can deflect radially to a small degree in order to account for any slight difference in their relative spacing from the central axis, which may occur for example as a result of manufacturing or assembly tolerances.

Also, it is important to note that the only parts of the entire support assembly 25 which actually make direct contact with the outer surface 9 of the light pipe 5, apart from the make-up piece 6 at its widest end, are the convex bearing surfaces 33 of the balls 31. Because the balls are made from relatively hard material, such as metal or ceramic, their convex bearing surfaces 33 actually only make contact with the outer surface 9 of the light pipe at very small, discrete, points. This means that contact between the support assembly 25 and the light pipe 5 is limited (in the four-ball arrangement illustrated) to four very small contact points. This minimises any disruption of the internal reflection within the light pipe 5 as light is passed along it.

The spring 34 applies a continuous biasing force 42 to the support assembly 25 and thus serves to ensure that the convex bearing surfaces 33 of the balls 31 are always maintained in point contact with the surface 9 of the light pipe 5. The spring, and also to some extent the adhesive 32 securing the balls 31, permits small movements or deflections of the support assembly 25 within the main housing 13 such as might occur, for example, due to shocks or vibrations imparted to the arrangement in use, or perhaps due to thermal expansion and contraction of the various components arising from a variation in ambient temperature.

It is to be appreciated that whilst the invention has been described above with reference to a specific embodiment, various changes or modifications can be made without departing from the scope of the present invention. For example, turning now to consider FIG. 14, there is illustrated in cross-sectional view an alternative configuration of the support assembly 25. In this modified arrangement the balls 31, which each define a respective convex bearing surface 33, are fixedly mounted relative to the support housing 26 rather than being resiliently mounted as in the case of the previously described embodiment illustrated in FIGS. 7 and 8. More particularly, it will be noted that the balls 31 are each securely held in respective concave recesses 43 formed in the support housing 26, by a clamping ring 44 which has similar concave recesses and which is clampingly engaged with the support housing 26 to trap the balls 31 therebetween.

FIG. 15 illustrates yet another alternative configuration of the support assembly 25 in which the assembly is provided as single unit in the form of a modified support housing 26 which has integrally formed convex bearing surfaces 33 defined by the radially inwardly directed surfaces of small projections 45 formed around the central bore 28.

Figure 16:
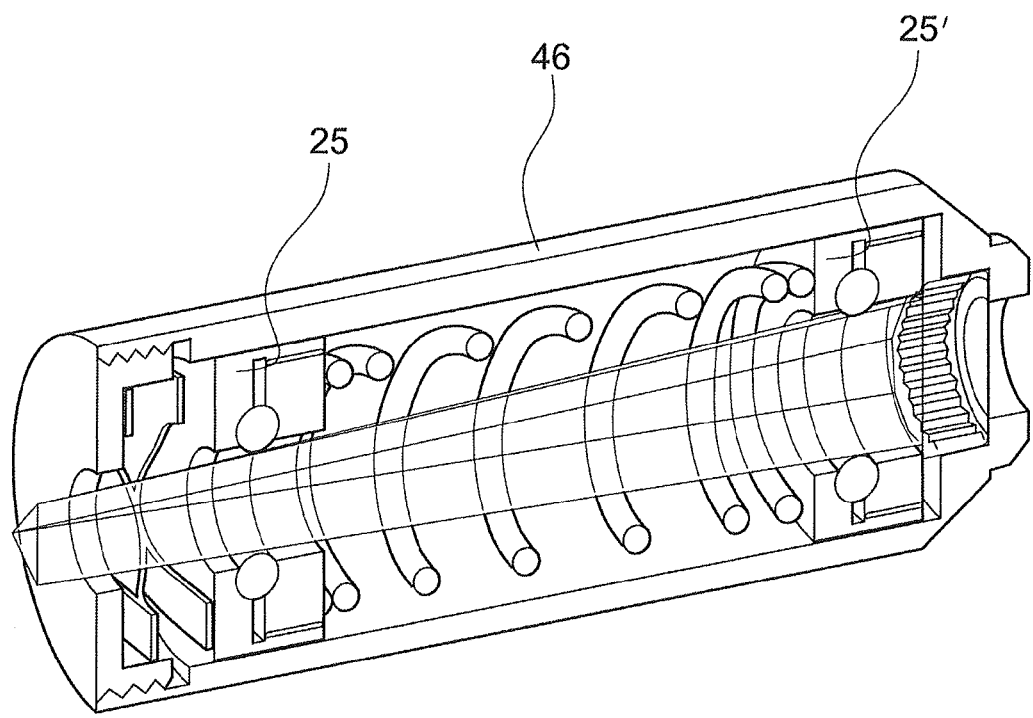
FIG. 16 is a longitudinal cross-sectional view similar to that of FIG. 12, but which shows a mount arrangement in accordance with a further embodiment.

FIG. 16 illustrates an entire mounting arrangement in accordance with another embodiment of the present invention, which comprises a second support assembly 25' arranged towards the wider end 8 of the light pipe 5, in addition to a first support 25 which is provided towards the narrower end 7 of the light pipe as described above. In the particular arrangement illustrated, the two support assemblies 25, 25' both have the modified configuration illustrated in FIG. 14, although it is to be appreciated that the two support assemblies could instead take the form of those illustrated either in FIGS. 7 and 8, or FIG. 15.

As will be noted in FIG. 16, the two support assemblies 25, 25' are generally identical to one another except for the fact that the second assembly provided around the wider end 8 of the light pipe 5 has a central bore 28 which is somewhat larger in diameter in order to accommodate the larger diameter of the light pipe in that region.

Importantly, it will be noted that the second support assembly 25' is biased away from the first support assembly 25 and towards the wider end of the light pipe 5 by a spring 46 which is provided between the two assemblies. In the embodiment illustrated, the spring 46 is provided in the form of a helically wound compression spring, although it is to be appreciated that alternative configurations of springs could be used instead.

The second support assembly 25' provides additional support towards the wider end of the light pipe 5, but in alternative arrangements could be provided mid-way along the length of the light pipe. Either of these types of two-support assembly arrangements may be useful in supporting long light pipes.

Whilst all of the embodiments described above have been disclosed as using a wave spring 34 to bias the (first) support assembly 25 away from the end cap 36 and towards the wider end of the light pipe 5, it is to be noted that the spring could be replaced with an alternative type, such as for example a helically wound compression spring.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A mount arrangement for supporting a tapered light pipe (5) of a type having a relatively wide end (8), a relatively narrow end (7), and an outer surface (9), the mount arrangement including:
a support assembly (25) provided within a housing (13) and having a central bore (28) for receipt of said light pipe (5) through the support assembly (25), the support assembly (25) being arranged for movement within the housing (13) along the axis of the bore (28), and having within said central bore (28) an array of inwardly directed convex bearing surfaces (33) arranged in spaced relation to one another around the central bore (28), wherein the support assembly (25) is biased by a biasing force towards the relatively wide end (8) of the light pipe (5) so as to urge the convex bearing surfaces (33) into contact with the outer surface (9) of the light pipe (5),
wherein the support assembly (25) is spring-biased towards the relatively wide end (8) of the light pipe (5).

2. A mount arrangement according to claim 1, wherein the support assembly (25) is biased by a wave spring (34).

3. A mount arrangement according to claim 1, wherein the support assembly (25) is biased by a coil spring.

4. A mount arrangement according to claim 2, wherein said spring (34) defines a central bore (35) sized to fit around the light pipe (5) in spaced relation to the light pipe.

5. A mount arrangement according to claim 1, wherein each said convex bearing surface (33) has at least a region, arranged for contact with the outer surface (9) of the light pipe (5), which has the geometry of a spherical cap.

6. A mount arrangement according to claim 1, wherein each said convex bearing surface (33) is provided as an integral part of the support assembly (25).

7. A mount arrangement according to claim 1, wherein each said convex bearing surface (33) is defined by a respective ball (31) mounted to the support assembly (25).

8. A mount arrangement according to claim 7, wherein each said ball (31) is resiliently mounted to the support assembly (25) to permit a degree of resilient deflection in a generally radial direction relative to the central bore (28).

9. A mount arrangement according to claim 8, wherein each said ball (31) is resiliently mounted to the support assembly (25) by a flexible adhesive (32).

10. A mount arrangement according to claim 8, wherein each said ball (31) is mounted at the end of a respective passage (30) to as to project inwardly of the bore (28) from the passage (30), and wherein at least a region of each passage (30) adjacent the respective ball (31) is filled with said adhesive (32).

11. A mount arrangement according to claim 1, wherein said convex bearing surfaces (33) are equi-spaced around the central bore (28) of the support assembly (25).

12. A mount arrangement according to claim 1 configured to support said light pipe (5) of a type having a polygonal cross-sectional profile, wherein each said convex bearing surface (33) is arranged for contact with a respective facet (10) of the outer surface (9) of the light pipe (5).

13. A mount arrangement according to claim 1, including a second support assembly (25') in addition to said, first, support assembly (25), wherein the second support assembly (25') is provided in spaced relation to the first support assembly (25) for the receipt therethrough of a wider part of said tapered light pipe (5), the second support assembly (25') also being biased towards the relatively wide end (8) of the light pipe (5).

14. A mount arrangement according to claim 13, wherein the second support assembly (25') is biased away from the first support assembly (25) by a spring (46) arranged between the two assemblies (25,25').

15. A mount arrangement for supporting a tapered light pipe (5) of a type having a relatively wide end (8), a relatively narrow end (7), and an outer surface (9), the mount arrangement including:

a support assembly (25) provided within a housing (13) and having a central bore (28) for receipt of said light pipe (5) through the support assembly (25), the support assembly (25) being arranged for movement within the housing (13) along the axis of the bore (28), and having within said central bore (28) an array of inwardly directed convex bearing surfaces (33) arranged in spaced relation to one another around the central bore (28) wherein the support assembly (25) is biased by a biasing force towards the relatively wide end (8) of the light pipe (5) so as to urge the convex bearing surfaces (33) into contact with the outer surface (9) of the light pipe (5), wherein each of said convex bearing surfaces (33) is defined by a respective ball (31) mounted to the support assembly (25).

16. A mount arrangement according to claim 15, wherein each of said balls (31) is resiliently mounted to the support assembly (25) to permit a degree of resilient deflection in a generally radial direction relative to the central bore (28).

17. A mount arrangement according to claim 16, wherein each of said balls (31) is resiliently mounted to the support assembly (25) by a flexible adhesive (32).

18. A mount arrangement according to claim 17, wherein each of said balls (31) is mounted at the end of a respective passage (30) to as to project inwardly of the bore (28) from the passage (30), and wherein at least a region of each passage (30) adjacent the respective ball (31) is filled with said adhesive (32).

19. A mount arrangement according to claim 15, wherein said convex bearing surfaces (33) are equi-spaced around the central bore (28) of the support assembly (25).

20. A mount arrangement according to claim 15 configured to support said light pipe (5) of a type having a polygonal cross-sectional profile, wherein each of said convex bearing surfaces (33) is arranged for contact with a respective facet (10) of the outer surface (9) of the light pipe (5).

* * * * *